US00RE38284E

(19) United States
(12) Reissued Patent
Allen et al.

(10) Patent Number: US RE38,284 E
(45) Date of Reissued Patent: Oct. 21, 2003

(54) COMPUTER-ASSISTED INTERACTIVE METHOD AND APPARATUS FOR MAKING A MULTI-MEDIA PRESENTATION

(75) Inventors: David Allen, Van Nuys, CA (US); Brian Leader, Sunland, CA (US); Thomas Reiter, Sherman Oaks, CA (US)

(73) Assignee: Information Presentation Solutions Development, Inc., Los Angeles, CA (US)

(21) Appl. No.: 08/985,814

(22) Filed: Dec. 5, 1997

Related U.S. Patent Documents

Reissue of:
(64) Patent No.: 5,473,744
Issued: Dec. 5, 1995
Appl. No.: 08/271,237
Filed: Jul. 6, 1994

(63) Continuation of application No. 07/952,919, filed on Sep. 28, 1992, now abandoned.

(51) Int. Cl.[7] ..... G06F 17/21
(52) U.S. Cl. ..... 715/500.1; 345/723
(58) Field of Search ..... 345/302, 115, 345/329, 723; 707/501; 715/500.1

(56) References Cited

U.S. PATENT DOCUMENTS

| | | | | | |
|---|---|---|---|---|---|
| 4,616,327 | A | * | 10/1986 | Rosewarne et al. | 395/147 |
| 4,766,581 | A | * | 8/1988 | Korn et al. | 395/156 |
| 4,864,516 | A | * | 9/1989 | Gaither et al. | 345/302 |
| 4,876,657 | A | * | 10/1989 | Saito et al. | 345/1 |
| 4,905,094 | A | * | 2/1990 | Pocock et al. | 395/154 |
| 4,962,475 | A | * | 10/1990 | Hernandez et al. | 395/157 |
| 5,093,907 | A | * | 3/1992 | Hwong et al. | 395/152 |
| 5,119,188 | A | * | 6/1992 | McCalley et al. | 358/86 |
| 5,119,474 | A | * | 6/1992 | Beitel et al. | 345/302 |
| 5,204,768 | A | * | 4/1993 | Tsakiris et al. | 359/148 |
| 5,307,055 | A | * | 4/1994 | Buskin et al. | 345/1 |
| 5,363,482 | A | * | 11/1994 | Victor et al. | 345/302 |
| 5,367,627 | A | * | 11/1994 | Johnson | 345/302 |
| 5,404,316 | A | * | 4/1995 | Klinger et al. | 345/302 |
| 5,428,774 | A | * | 6/1995 | Takahashi et al. | 345/302 |
| 5,440,678 | A | * | 8/1995 | Eisen et al. | 345/302 |
| 5,596,695 | A | * | 1/1997 | Hamada et al. | 345/302 |
| 5,634,018 | A | * | 5/1997 | Tanikoshi et al. | 345/329 |
| 5,754,851 | A | * | 5/1998 | Wissner | 345/302 |
| 6,072,503 | A | * | 6/2000 | Tani et al. | 345/302 |
| 6,118,444 | A | * | 9/2000 | Garmon et al. | 345/302 |

OTHER PUBLICATIONS

PR Newswire. Beck–Tech Demonstrates Desktop Video At Siggraph with Macromovies (TM) and CHromatron, DIALOG a/n 01047811 from file 621, 1239 words (reprinted), Jul. 1987.*

Rosch, Winn L. "On with the Show", PC Magazine, v. 6, No. 13, p. 347+4 (reprinted 5 pages), Jul. 1987.*

McKay W.E. et al. "Virtual Video Editing in Interactive Multimedia Applications", Communications of the Association of Computing Machinery (ACM), v. 32, No. 2, pp. 802–810, Jul. 1989.*

(List continued on next page.)

*Primary Examiner*—Stephen S. Hong
(74) *Attorney, Agent, or Firm*—Irell & Manella, LLP

(57) ABSTRACT

A computer-assisted method for presenting a multi-media plurality of elements. Each element, including, for example, video images, still images and documents, is stored by assigned index number in an appropriate input device such as a VHS recorder or laser disk reader (video and stills) or an optical or magnetic disk reader (documents). The input devices are addressed by such index numbers to thereby call up and display selected elements in a WINDOWS format. The format is adjustable from a basic default setting to enable the user to customize frames prior to entry into a script buffer. Thereafter the script buffer is addressable, permitting the frames constituting the presentation to be entered into a script file in a preferred presentation sequence. The presentation is made by addressing the script file to recall selected frames. The method allows the user to preview flames one at a time and allows the user to reformat each frame prior to public display.

43 Claims, 5 Drawing Sheets

OTHER PUBLICATIONS

Brownstein, M., "Products to show Live Video on MAC Screen", Infoworld, v. 11, n. 27, p. 8 (reprinted abstract only), Jul. 1989.*
Doherty, R. "Tools to Mix Media Debut at MacWorld", DIALOG (TM) a/n 00635353 from file 647, Electronic Engineering Times, n. 551, 450 words (1 page reprinted), Aug. 1989.*
Zheng, Y. et al., "DMT—A Demonstration Tool", Software Practice and Experience, v. 21, n. 9, pp. 949–961, Apr. 1991.*
Camenga, B. "Micromind Director: Micromind's Latest Release Takes Animation Beyond Playback and Intro Interactivity", MacUser, v. 7, n. 3, pp. 72+3 (reprinted 2 pages), Mar. 1991.*
Kendall, R. "Beyond the Screen Show: PC Based Presentation Packages (Software Review)", PC Magazine, v. 10, n. 9, pp. 134+1 (reprinted), May 1991.*
MIT Media Lab, "Cinematic Primitives for Multimedia", Institut of Eectrical and Electronics Engineers (IEEE) Computer Graphics and Applications, v. 11, n. 4, pp. 67–74, Jul. 1991.*
Anonymous, "Harvard Graphics for Windows: Software Publishing Begins Shipping", EDGE: Work–Group Computing Report, v. 3, n. 85z, p. 12 (reprinted), Jan. 1992.*
Ito, R. New on the Menu (new Macintosh Products), MacUser, v. 8, n. 3, p. 39, Mar. 1992.*
Green, D. et al., "DiVA VideoShop a Complete Video Production Center", Infoworld, v. 14, n. 33, pp. 111+1 (reprinted), Aug. 1992.*
Moreau, Dennis R., "The USL NASA PC R&D Interactive Presentation Development System", National Technical Information Services (Baltimore) Report No. N8914979, pp. 1–8, Aug. 1984.*
Yager, "Live from IBM–It's Storyboard"BYTE (Feb. 1991), pp. 128 and 130.*
"IBM's Storyboard Packages Animation, Video, and Sound", MacIntosh News (Jul. 1990), pp. 79–80.*
"MediaMaker", Mac User, vol. 7 No. 12 (Dec. 1991), pp. 72–74.*
Yager, "Build Multimedia Presentations with MacroMind's MediaMaker", BYTE (Sep. 1991), pp. 302–304.*
Stevens, "Choices Grow for Presentation Software", MacWeek vol. 2 No. 43 (Oct. 25, 1988), pp. 14–15.*
Parascandolo, "Fresh Persuasion", Macuser vol. 5 No. 12 (Dec. 1989), pp. 250–251.*
"MacDraw Pro User's Guide", Claris Corporation (1991), pp. 7–2 to 7–15.*
"PODIUM: Presentation Overlay Display for Interactive Uses of Media", SHARE Europe Proceedings (1990), pp. 193–200.*
Parascandolo, et al., "Presentations with a Punch", MacUser vol. 5 No. 9 (Sep. 1989), pp. 92–102.*

* cited by examiner

AMENDED

48
HARD DISK
18
CPU
21
20
KEYBOARD
34
VIDEO INPUT
36
OPTICAL DISK
12
22
14

COMPUTER-ASSISTED INTERACTIVE METHOD AND APPARATUS FOR MAKING A MULTI-MEDIA PRESENTATION

Matter enclosed in heavy brackets [ ] appears in the original patent but forms no part of this reissue specification; matter printed in italics indicates the additions made by reissue.

This application is a continuation of application Ser. No. 07/952,919, filed Sep. 28, 1992, now abandoned.

BACKGROUND

1. Field of the Invention

The present invention relates to a computer-assisted method for making a presentation drawn from a plurality of visual media. More particularly, this invention pertains to such a method that permits user/machine interaction in the design and programming of a multi-media presentation and user/machine/audience interaction in its delivery.

2. Description of the Prior Art

The presentation of information is an essential educational and persuasive function of commerce. The prepared or formal narrated audio-visual presentation is a ubiquitous adjunct of modern-day sales of both goods and services and the development of this hybrid of technology and psychology continues unabated, seeking and finding new applications on a more or less continual basis.

Generally, audio-visual presentations have been limited to text and images; that is, stills, graphs and the like. This is in recognition of the fact that some information is mote usefully presented in at least a partially visual manner. Systems for making such presentations include the overhead projector, the television monitor, the slide projector and related technologies.

A primary use of audio-visual information presentation is advocacy. While the use of visual media can provide dramatic effects, command of the viewer's attention is a constant preoccupation of a presenter. For this reason, audio-visual presentations should be as unencumbered as possible with technology-imposed pauses or "breaks" that can cause a viewer to become fatigued thereby limiting his attention span. Also, even a "smooth" presentation, if poorly designed, may lose the audience's attention through internal aesthetic illogic and/or incompatibility with the dynamic "mood" of the audience. Thus, in both the creation and delivery of an effective presentation, the speaker or advocate should possess maximum flexibility of action. Computer-assisted systems frequently provide additional tools but fail to permit the user to address important audience psychology issues.

SUMMARY AND OBJECTS OF THE INVENTION

It is therefore an object of the present invention to provide a computer-assisted method and associated apparatus for designing and displaying a multi-media visual presentation that provides the user with the flexibility to review throughout both processes so that the eventual presentation is capable of capturing and holding the audience's attention.

It is another object of this invention to provide a method and apparatus that achieves the preceding object by interactive techniques.

It is yet another object of this invention to achieve the above-listed object by means of a computerized scheme that permits the amplification editing of both presentation frames and script throughout.

The preceding and other objects are achieved by the invention which provides, in a first aspect, a method for presenting a multi-media plurality of visual elements. The method is begun by assigning a unique index to each of the elements and loading each element by such index into a predetermined input device. The input devices are addressed so that selected elements are displayed. A select/reject decision is then made with respect to the displayed elements and the process is repeated until a frame comprising at least one visual element is completed. The frame is then stored in a script buffer and the process is repeated until a plurality of frames constituting a presentation is accumulated in the buffer.

A predetermined frame is then selected and displayed in a selected format. This process is repeated until the presentation is finished.

In a second aspect, the invention provides apparatus for presenting a multi-media plurality of visual elements. Such apparatus includes means for assigning a unique index to each of the elements. A plurality of input devices is provided as is means for loading each of the elements into preselected ones of the input devices.

Means are provided for addressing the input devices so that selected elements are recalled and for displaying the recalled elements. Means are additionally provided for making a select/reject decision with respect to each of the displayed elements so that at least one frame comprising a plurality of elements is formed.

Means are additionally provided for storing the frames and for recalling predetermined ones thereof. Finally, means are provided for displaying the frames in a preselected format.

The foregoing and other features and advantages of the invention will become apparent from the detailed description that follows. Such description is accompanied and illustrated by a set of drawing figures. Numerals of the drawings, corresponding to those of the written description, point to the features of the invention. Like numerals refer to like features throughout both the written description and the drawing figures.

DETAILED DESCRIPTION

Figure 1:
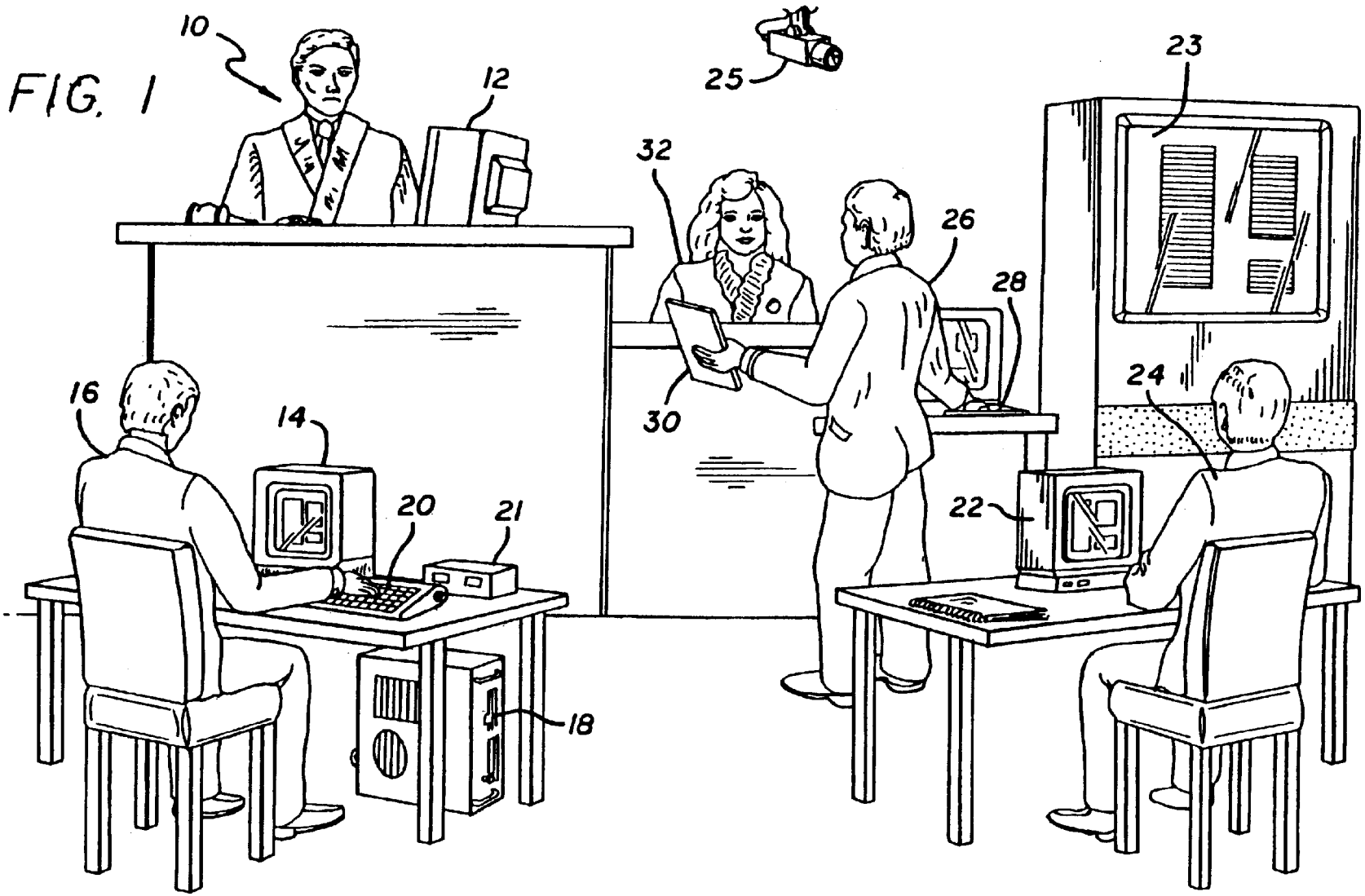
FIG. 1 illustrates an application of the present invention to courtroom advocacy.

Turning to the drawings, FIG. 1 illustrates an application of the present invention to courtroom advocacy. As shown and discussed below, the method is adapted in the arrangement of FIG. 1 to enhance the effective presentation of documentary evidence to a judge 10 and/or other trier of fact such as a jury (not shown) who may view it on a conveniently-positioned CRT-type display 12. A second display device 14, associated CPU 18, input device such as a keyboard 20 and a switching panel 21 for "previewing"

purposes (discussed below) are located at the command table of an attorney/user 16. Also illustrated in the figure as an additional system option and capability arc a large screen video projector 23 and a courtroom mounted television camera 25. The large screen projector 23 may be particularly useful for the presentation of video evidence to a jury (not shown) while the camera 25, which may comprise part of either a super VGA digital (for display on a computer-type screen) or an analog (for display on a CRT type screen) system may be usefully employed in a courtroom setting as the system described below can be readily extended to support real time video applications such as the taping of witness testimony (on the stand) and for telecommunications. The extension of the invention to such real time video applications readily follows, and will be apparent from the structure of the system as described below.

Returning to the "base" configuration, the CPU 18 (which includes memory) is electronically and functionally coupled to the display 12 of the judge 10 and to a third display 22 located at the counsel table of the opposing attorney 24. Neither the opposing attorney 24 nor the judge 10 has access to the input keyboard 20 and, thus, neither can control the images that appear on their "passive" displays. Furthermore, the switching panel 21 permits the attorney/use 16 to selectively "blank" both the court's and the opposing counsel's display screens.

An examining attorney 26 can control the timing of the sequence of frames forming the presentation by means of a hand-held "mouse" or "clicker" 28. Alternatively, the sequence may be controlled by the attorney/user 16 through manipulation of the keyboard 20 or other input device. The sequence of frames forming a presentation may be selected by any number of criteria. Such criteria will often depend upon the type of application. In a courtroom setting, for example, the frame sequence and timing may be dictated by the order in which the examining counsel 26 plans to present documents 30 to a witness 32. (Alternatively, the witness might be provided with a separate passive display device.) This will give attorneys, witnesses and the trier of fact the benefit of numerous clarifying visual effects. Variations and mixtures of such courtroom arrangements are, of course, possible. For example, each attorney and witness can be provided with both a display and a hard copy of all documentary evidence with the exception of evidence, such as motion video, that is inappropriate for presentation via hard copy. Local evidentiary rules and constraints, along with the parties' stipulations, will dictate acceptable system and method variations. Non-courtroom presentations, whether of legal documents or otherwise, will call for other criteria.

While the system as illustrated in FIG. 1 is integrated into a courtroom setting, it will be appreciated from the discussion that follows that it may be readily adapted to any type of presentation, providing the benefits of computer-assisted user/machine/audience interaction to numerous applications of the technology. General business presentations will oftentimes benefit from the resulting ease of observation of a cohesive and well-coordinated custom designed and displayed presentation in accordance with the methods disclosed herein.

Figure 2:
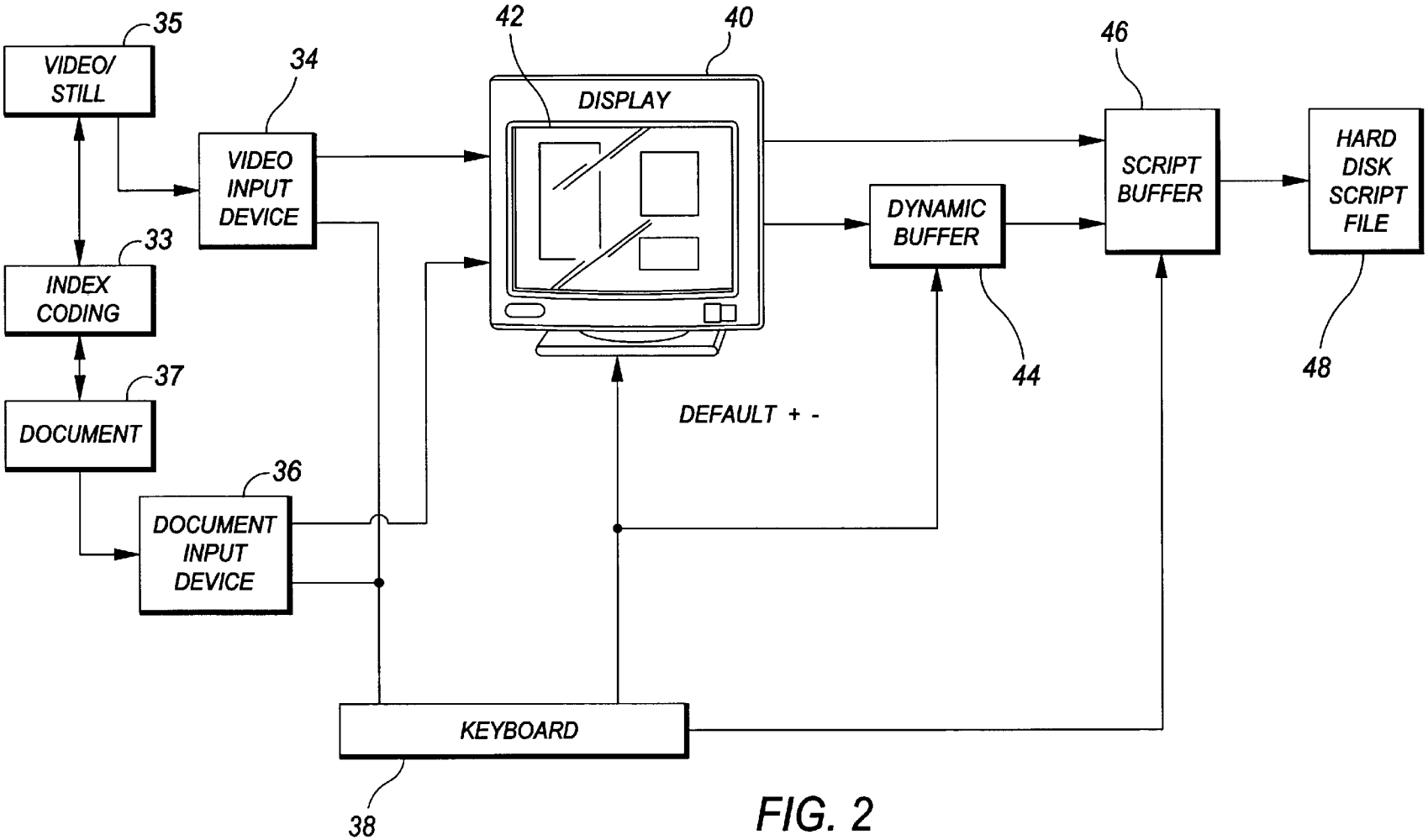
FIG. 2 is a schematic block diagram of the subsystem for constructing a presentation in accordance with the method of the invention.

FIG. 2 is a block schematic diagram that illustrates the main elements of the subsystem for constructing a presentation in accordance with the method of the present invention. A conventional, preferably manually operable, index/coding means 33 is provided for assigning a unique "index number" identification to each visual element. The index/coding means is operationally engaged to various devices for storing "candidate" visual elements for possible inclusion in the attorney's presentation. As shown in the figure, these include, but are not limited to, a video storage means 35 such as a laser disk for storage of video and still elements [and camera/real time video input device 25.],*and a document storage means 37 such as an optical disk.*

Once the elements stored in means 35 and 37 have been assigned index number they become addressable by those index numbers for input to the presentation system. Various conventional input devices are provided for retrieval of the prepared and indexed visual effects by index number. Representative input devices include a laser disk player 34 for still and motion video images and an optical disk player 36 for documents, each of which is coupled to the appropriate storage means. Other known arrangements are, of course, possible. For example, a VHS recorder can he employed for storage of motion and still video information on a video tape medium while a magnetic disk player may be employed for retrieval of documents stored on magnetic disk.

A construction keyboard 38 permits the user to address the storage means 35 and 37 by index numbers to call up the desired images for eventual viewing on a conventional CRT display device 40. As can be seen, the screen 42 of the display device 40 is configured in a WINDOWS format whereby, by utilizing software of the type commercially available from Videologic, Inc., the index-addressed video images may be selectively displayed within desired WINDOWS sections.

While a default display format is provided, this default setting of the screen 42 may be overwritten to customize the design of the screen by commands provided through the keyboard 38. A dynamic buffer 44 accepts and stores the parameters that describe the design (whether default or customized) of the screen 42.

A script buffer 46 receives digital inputs from the construction keyboard 38 defining presentation "frames." Such data includes the index numbers of selected visual elements and the parameters that describe the design of the screen 42. Such data are entered into the script buffer 46 as the screen display is designed while, upon the entry of a "COMPLETE" or "END" command from the keyboard 38, a hard disk/script file 48 stores the plurality of design frames that comprise an entire presentation.

Figure 3:
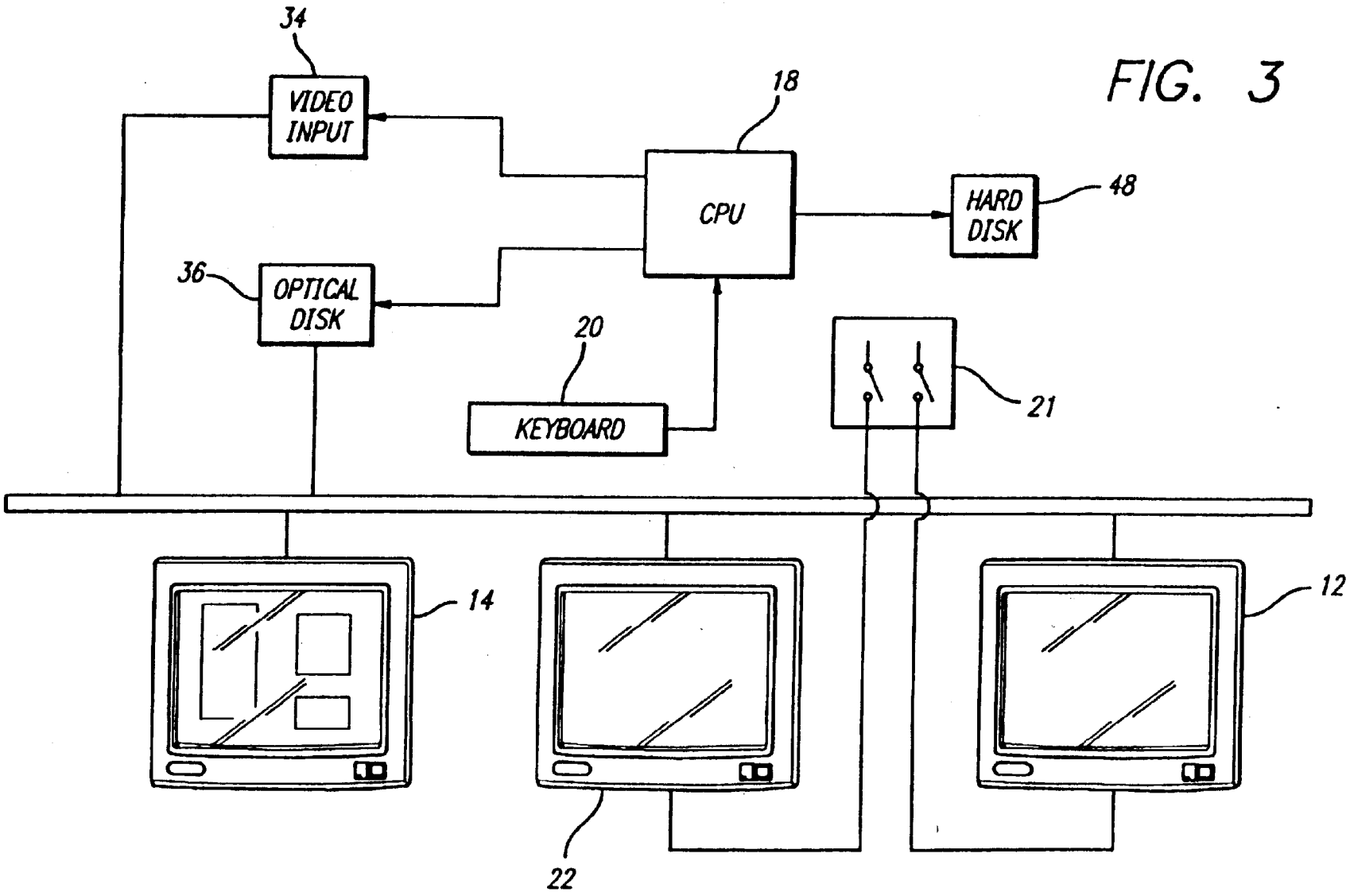
FIG. 3 is a schematic block diagram of the subsystem for delivering a presentation in accordance with the method of the invention.

FIG. 3 is a schematic block diagram of the subsystem for delivering a presentation in accordance with the method of the invention. As shown in FIG. 1, displays 12, 14 and 22 are provided for the court, the user/attorney and the opposing attorney respectively. The keyboard 20 communicates with the CPU 18, thereby permitting the user/attorney to address the CPU 18. The hard disk or script file 48 that stores the plurality of custom-designed frames that define the presentation is coupled to the CPU 18 as are the input devices 34 and 36. As a result, the user/attorney may manipulate the presentation keyboard 20 so that selected presentation frames are recalled from the script file 48. The index numbers and parameters defining the design of the frame screens, may then be retrieved by the CPU 18 to actuate the input devices 34 and 36. As a result, the presentation frames may be viewed on the display devices 12, 14 and 22. The control switch 21, operable only by the user/attorney 16, permits him to control (i.e. blank or view) the screens of the display devices 12 and 22. This feature permits the user/attorney 16 to "preview" presentation frames prior to display, adding additional flexibility to the system.

Figure 4:
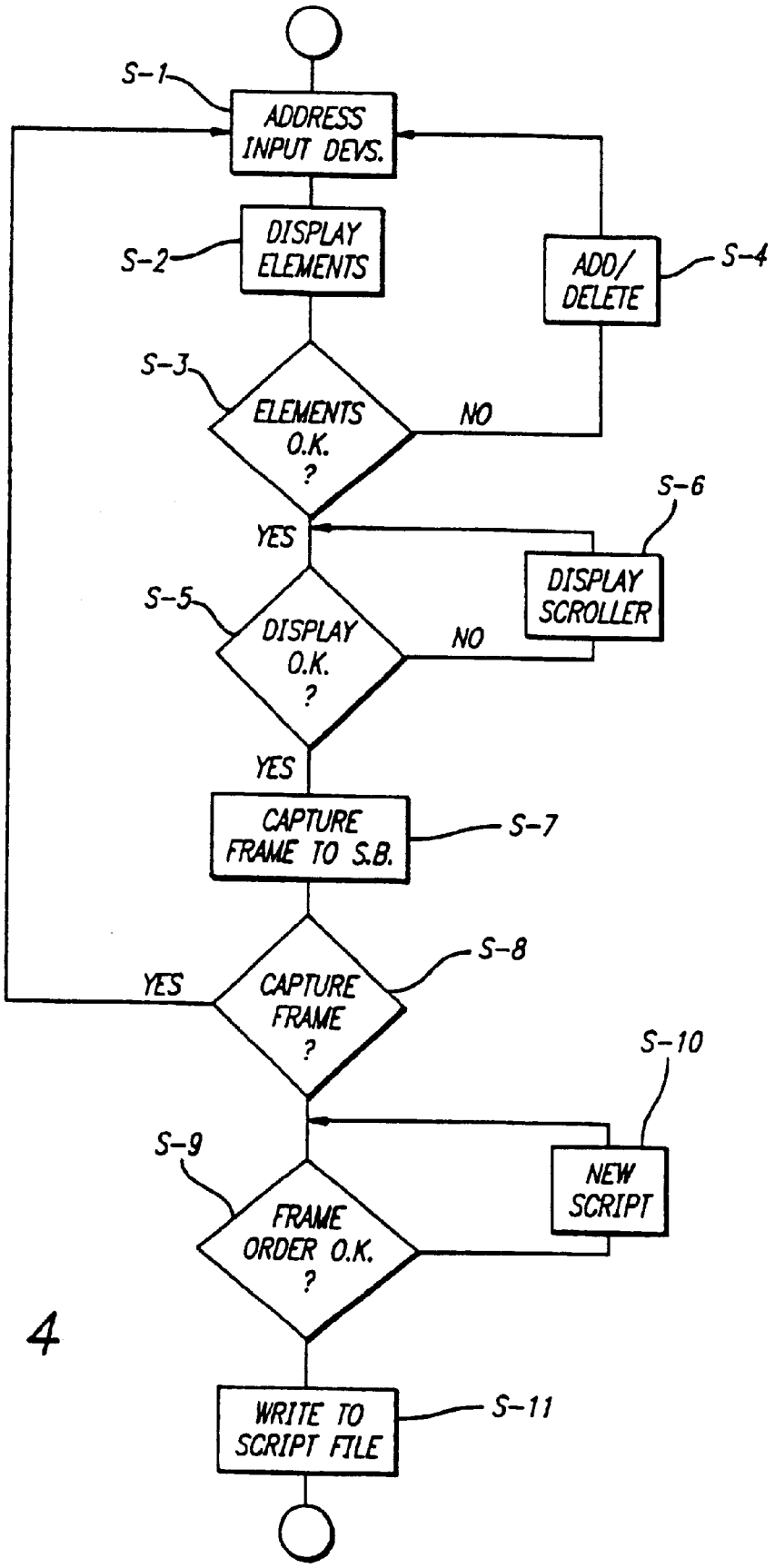
FIG. 4 is a flow diagram of the process for constructing a presentations and FIG. 5 is a block diagram of the process for delivering a presentation in accordance with the invention.

FIG. 4 is a flow diagram of the process for constructing a presentation in accordance with the invention. This process is begun at step S-1 by the user addressing the various storage devices such as the video storage means 35 and the document storage means 37 by multi-media element index numbers to thereby specify the visual elements that he wishes to try in a frame that is to be part of the presentation. The elements are then input to the appropriate image players 34 and 36 and displayed on the screen 42 of the display device 40 as shown at step S-2.

The user, as he views the addressed visual elements in the default WINDOWS setting of the format of the screen 42 then determines at step S-3 whether the grouping of elements "makes sense" as a single presentation frame. Thus, he is continually given opportunities to test and the retest element grouping for suitability. In the event that he is not totally satisfied with the composition of a frame under construction, he may proceed to step S-4 and choose to add or delete visual elements from the frame under construction by manipulating the keyboard 38 to address the storage devices 35 and 37.

Upon determining that a grouping of presentation frame elements is satisfactory, the user proceeds to step S-5 to evaluate the adequacy of the screen design under the default setting in terms of such parameters as the number of elements displayed, their relative sizes and positions, the "zoom" level of each element and the timing of the display of the elements within the frame. In the event that he wishes to customize the format of the screen 42, this is done by addressing a display scrollbar that maybe call up (on the screen 42) through the construction keyboard 38. The desired modifications to the default settings of the screen 42 are entered into the display scrollbar at step S-6. After the appropriate modifications have been made, the user then proceeds to step S-7 where a CAPTURE command is entered through the construction keyboard 38 and the description of the frame, including both display parameters and element indices, is entered into the script buffer 46.

The user then proceeds to step S-8 where an evaluation is made of the completeness of the presentation. In the event that additional frames are required, he will return to step S-1, choosing the elements of the next frame by appropriate corresponding index numbers and then proceed through the above-described screen display design. When he is satisfied that a sufficient number of frames have been designed for the presentation, he then proceeds to step S-9 where the script may be rearranged in sequence. (The data defined in presentation frames is initially entered into the script buffer 46 sequentially by order of composition.) In the event that the user wishes to reorder the frames, he may redefine their order, rearranging the data within the script buffer 46 by entry of appropriate commands through the keyboard 38 at step S-10. Once a satisfactory order is arrived at, he then proceeds to step S-11 by entering a command through the keyboard 38 to cause the data within the script buffer 46 to be written to the hard disk 48 which acts as the script file. Thus, as shown, the user is provided with a systematic and interactive computer-assisted system for creating a custom made presentation of the various multi-media elements available for selection.

The delivery phase of the process may take place in a courtroom, a boardroom or any one of innumerable settings. The user is not limited to the designed script but rather possesses a substantial degree of flexibility during delivery. This may be particularly useful in a courtroom setting where one must be able to react to unexpected developments.

Figure 5:
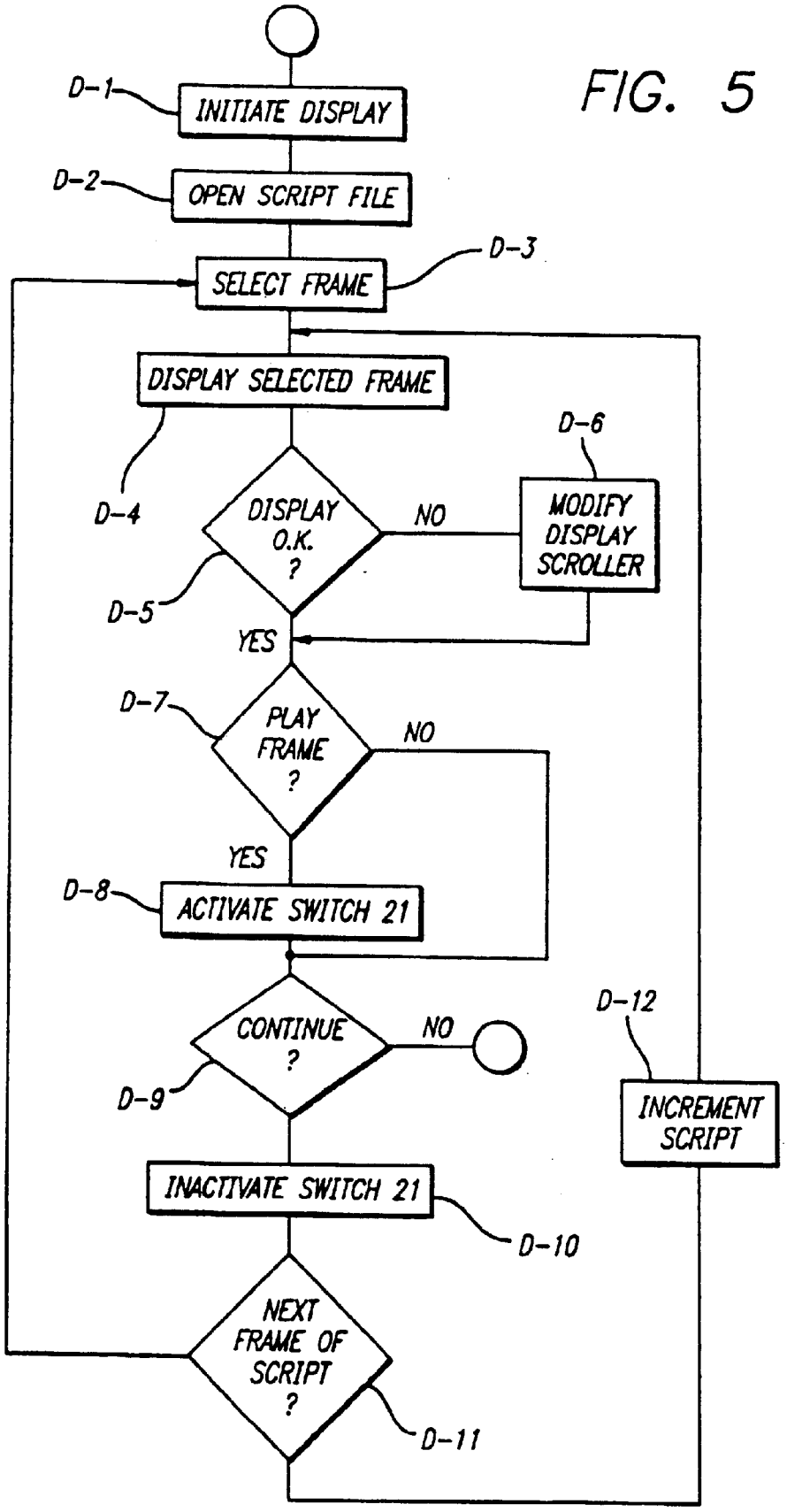

Referring to the flow diagram of FIG. 5, the delivery process is begun by the user/attorney 16 initializing the display screen at step D-1 and addressing the system to open the script file stored in the hard disk at step D-2. While a plurality of frames are stored onto the hard disk 48 and coded in accordance with a preferred presentation order, it is recognized that courtroom developments, for example, could dictate a different order. Thus, at step D-3 the user may address any frame within the script file by identification number. Further, as mentioned with reference to FIG. 3, the attorney/user 16 controls a switch 21 that controls the screens of the displays of the court and the opposing attorney. This permits frame previewing prior to display. With the screens of the court and the opposing counsel blanked by the switch 21, the user/attorney can display the selected frame at step D-4 on the screen of his courtroom display device 14. This allows some "last minute" rearrangement of the frame's design. At step D-5 the user may choose to alter some of the settings defining the display parameters by again calling up the display scrollbar and making the appropriate adjustments at step D-6.

*Such adjustments may include selecting the number of elements displayed, selecting the sizes of the elements displayed, selecting the relative positions of the elements, selecting the zoom level of each of the elements, and/or selecting the timing of element displays.*

Having made any desired modifications to the frame parameters, the user/attorney is still left with a choice as to whether the frame is to be presented to the court and to the opposing attorney. At step D-7 he may choose either to bypass presentation of the frame or may present it to the court and to the opposing attorney by changing the switch 21 at step D-8. After this decision has been made, the attorney/user seated at his counsel table next ascertains whether or not additional visual evidence, in the form of presentation frames, is to be shown at step D-9. In the event that the examination of a witness, for example, is complete, he may wish to terminate at this point. Of course, since it is possible to continue the previewing process without notice of the court or opposing counsel, he may proceed with portions of the aforesaid process even during argument or examination by the opposing attorney. For this purpose, the switch 21 is in activated at step D-10 to permit the attorney/user to continue to work without disrupting or confusing either the court or the opposing attorney. Of course, this permits the attorney/user to work without concern about the opposing attorney looking "over his shoulder."

In the event that the attorney/user decides to continue, he proceeds to step D-11 and chooses the next frame for previewing. In the event that he has decided to vary the delivery from the scripted presentation, he simply returns to step D-3, inputting the next desired frame number. In the event that he wishes to continue with the scripted presentation, he proceeds to step D-12, selecting the next frame of the presentation as stored in the script file of the hard disk 48.

By proceeding as above, it is seen that the user of the system is provided with additional "on the spot" flexibility that permits him to vary from the scripted order and, to a limited extent, re-customize each frame prior to display. Thus, while the interactive frame construction method of the prior figure provides the user with a great deal of flexibility in designing a presentation, the effect experienced by the viewing "audience" whether it be attorneys, a judge, jurors or, in other contexts, potential buyers, government officials or the like is not entirely outside his control after the construction process has occurred. Rather, one may readily adapt a carefully-design presentation to the changing circumstances. For example, questions may arise during a business presentation that would suggest some variance in the order of frame presentation. This can be seen to be easily accomplished by the method of the invention as described with reference to FIG. 5.

Thus it is seen that the present invention provides an improved method for presenting a plurality of multi-media elements. By employing the teachings of the invention, which may be directly adapted to many fields of endeavor including law, business, medicine, government or any medium in which advocacy is required or, for that matter, to fields such as education which do not necessary fall within the bounds of advocacy, the user is provided with a powerful tool that enables him to carefully design a presentation that will capture the audience's attention. Furthermore, one may "fine tune" the designed presentation at the moment it is viewed, providing another tool to maximize the effectiveness of a visual presentation.

Whereas the interactive presentation system (marketed under the trademark "IPS") disclosed herein includes numerous hardware components that, apart from the system, function in conventional manners well known in the art, when combined (and driven by appropriate software module that are also well known in the art), a unique system function design process of total interactive display is achieved. The basic system is readily amenable to useful extensions such as the real time video applications discussed above. This can be achieved by employing a PC VCR, controlled by the IPS software, that allows the re-recording of pre-scripted video, real time video, scripted documents, annotated documents and scripted presentation for re-review on standard VHS players.

While this invention has been presented in its presently preferred embodiment, it is not limited thereto. Rather, this invention is limited only insofar as defined by the following set of patent claims and includes within its scope all equivalents thereof.

What is claimed is:

1. An interactive method for making a presentation comprising visual elements selected from text, graphics, still and motion video on at least one remote passive computer display comprising the steps of:

a) assembling said visual elements by (i) assigning a unique index to each of said elements and (ii) loading each of said elements into a predetermined input device by said unique index, (iii) then repeating steps i and ii until said visual elements have been indexed and loaded, then (iv) addressing said input devices by selected index members so that selected elements are displayed at discrete, addressable sections on a first active computer display, then (v) viewing said selected elements on said first active computer display, then (vi) making a select/reject decision with respect to each of said displayed elements, then (vii) repeating steps iv through vi until a frame comprising at least one visual element located at a predetermined discrete addressable section thereof is formed; then b) storing said frame in a script buffer; and then c) repeating steps a and b until a plurality of frames constituting a presentation is accumulated in said buffer; then d) displaying said presentation on a second active computer display by recalling a predetermined frame from said buffer; then e) reviewing said frame on said second active computer display while blanking said frame on at least one remote passive computer display, then f) independently addressing said discrete sections for said frame; then g) selectively editing said visual elements of said frame; then h) displaying said selectively adjusted frame on said at least one remote passive computer display; and then i) repeating steps d through g until a predetermined presentation has been displayed on said at least one remote computer display.

2. An interactive method as defined in claim 1 wherein the step of selectively editing further includes the steps of:

a) editing the number of elements displayed on an element-by-element basis;

b) editing the sizes of said elements displayed on an element-by-element basis;

c) editing the relative positions of said elements on an element-by-element basis;

d) editing the zoom level of each of said elements on an element-by-element basis; and e) editing the timing of element displays within said frame on an element-by-element basis.

3. An interactive method as defined in claim 2 further including the step of arranging said plurality of frames into a selected script sequence.

4. An interactive method as defined in claim 3 further including the step of storing said selected script sequence in a script file.

5. An interactive method as defined in claim 4 wherein the step of arranging said frame further includes the steps of:

a) calling up a scrollbar on said user display device; and then b) entering said adjustments.

6. An interactive method as defined in claim 1 wherein the step of selectively displaying said frame further includes the step of enabling said at least one remote passive computer display.

7. An interactive method as defined in claim 6 wherein said steps of selectively blanking and enabling further include the step of controlling said at least one passive remote computer display by means of an on/off switch.

8. An interactive method as defined in claim 1 further including the steps of:

a) providing said second active computer display to a user; and b) providing a first remote passive computer display to a fact finder; and c) providing a second remote passive computer display to an opposing counsel whereby said presentation is made in a courtroom.

9. Interactive apparatus for making a presentation comprising visual elements selected from text, graphics, still and motion video on at least one remote passive computer display comprising, in combination:

a) means for assembling said visual elements including (i) means for assigning a unique index to each of said elements, (ii) a plurality of input devices for receiving said indexed elements, (iii) means for loading each of said elements into preselected ones of said input devices, (iv) means for addressing said input devices by selected index numbers to recall selected elements, (v) a first active display for displaying said recalled elements at discrete, addressable sections thereof and (vi) means for making a select/reject decision with respect to each of said displayed elements;

b) a script buffer for storing at least one frame comprising selected visual elements;

c) a second active computer display;

d) means for recalling predetermined frames from said script buffer for review on said second active computer display; and e) means associated with said second active computer display for selectively blanking a frame on said at least one remote passive computer display;

f) means for independently addressing said discrete addressable sections of said recalled frames;

g) means for selectively editing said discrete sections of said frame; and h) means for selectively displaying said edited frames on said at least one remote passive computer display.

10. Interactive apparatus as defined in claim 9 wherein said means for selectively adjusting includes means for selectively arranging the format of said addressed elements.

11. Interactive apparatus as defined in claim 10 wherein said means for assembling further includes:

a) means for selecting the number of elements displayed;

b) means for selecting the sizes of said elements displayed;

c) means for selecting the relative positions of said elements;

d) means for selecting the zoom level of each of said elements; and e) means for selecting the timing of element displays within said frames.

12. Interactive apparatus as defined in claim 9 further including means for arranging said plurality of frames into a selected script sequence.

13. Interactive apparatus as defined in claim 12 further including a script file for storing said selected script sequence.

14. Interactive apparatus as defined in claim 9 wherein said means for selectively blanking comprises an on/off switch.

15. Interactive apparatus as defined in claim 9 wherein said means for arranging comprises a scrollbar.

*16. An interactive method for making a customized presentation on a first computer display based upon a prepared script file containing a plurality of frames, at least one of the plurality of frames including at least one uniquely addressable visual element, the prepared script file interactively created by retrieving the at least one visual element and displaying the at least one visual element at a discrete addressable section on the first computer display and allowing one or more visual elements to be iteratively added to or deleted from the first computer display, the method comprising:*

*reviewing the at least one frame on a second computer display while blanking the at least one frame on the first computer display;*

*interactively editing the at least one frame on the second computer display; and*

*displaying the at least one edited frame on the first computer display.*

*17. The method of claim 16, wherein interactively editing the at least one frame on the second computer display comprises at least one of the following:*

*editing a number of elements displayed;*

*editing a size of at least one of the elements displayed;*

*editing a relative position between the elements displayed;*

*editing a zoom level of at least one of the elements displayed; and*

*editing a timing of at least one element display.*

*18. The method of claim 16, further comprising:*

*selectively changing an order of the plurality of frames for display on the first computer display.*

*19. The method of claim 18, wherein selectively changing the order of the plurality of frames comprises at least one of the following:*

*deleting at least one of the plurality of frames from being displayed on the first computer display; and*

*selecting any frame from the plurality of frames for display on the first computer display.*

*20. The method of claim 16, wherein each of the at least one visual element comprises one of the following: text graphics, still and motion video.*

*21. The method of claim 16, wherein reviewing comprises:*

*reviewing at least one frame of the plurality of frames on the second computer display while blanking, the at least one frame on a plurality of computer displays including the first computer display;*

*and wherein displaying comprises:*

*displaying the at least one edited frame on the plurality of computer displays including the first computer display.*

*22. The method of claim 16, wherein interactively editing the at least one frame comprises:*

*interactively altering display parameters of the at least one frame.*

*23. The method of claim 16, wherein reviewing the at least one frame comprises:*

*reviewing the at least one frame on the second computer display while blanking the at least one frame on the first computer display using a switch.*

*24. The method of claim 16, wherein interactively editing the at least one frame on the second computer display comprises:*

*interactively editing one or more discrete sections of the at least one frame on the second computer display.*

*25. The method of claim 16, further comprising one or more of the following prior to reviewing:*

*making previously recorded real time and stored video images and stored documents available for retrieval as visual elements in accordance with unique index numbers;*

*viewing available visual elements to select elements for inclusion in said frames in accordance with unique index numbers; and*

*selecting a sequence of frames to form said plurality of frames for presentation.*

*26. An interactive system for making a customized presentation on a first computer display based upon a prepared script file containing a plurality of frames, at least one of the plurality of frames including at least one uniquely addressable visual element, the prepared script file interactively created by retrieving the at least one visual element and displaying the at least one visual element at a discrete addressable section on the first computer display and allowing one or more visual elements to be iteratively added to or deleted from the first computer display, the stem comprising:*

*means for reviewing the at least one frame on a second computer display while blanking the at least one frame on the first computer display;*

*means for interactively editing the at least one frame on the second computer display; and*

*means for displaying the at least one edited frame on the first computer display.*

*27. The system of claim 26, wherein the means for interactively editing the at least one frame on the second computer display comprises at least one of the following:*

*means for editing a number of elements displayed;*

*means for editing size of at least one of the elements displayed;*

*means for editing a relative position between the elements displayed;*

*means for editing a zoom level of at least one of the elements displayed; and*

*means for editing a timing of at least one element display.*

*28. The system of claim 26, further comprising:*

*means for selectively changing an order of the plurality of frames for display on the first computer display.*

*29. The system of claim 28, wherein the means for selectively changing the order of the plurality of frames comprises at least one of the following:*

*means for deleting at least one of the plurality of frames from being displayed on the first computer display; and*

*means for selecting any frame from the plurality of frames for display on the first computer display.*

*30. The system of claim 26 wherein each of the at least one visual element comprises one of the following: text, graphics, still and motion video.*

*31. The system of claim 26, wherein means for reviewing comprises:*

*means for reviewing at least one frame of the plurality of frames on the second computer display while selectively blanking the at least one frame on a plurality of computer displays including the first computer display;*

*and wherein means for displaying comprises:*

*means for displaying the at least one edited frame on the plurality of computer displays including the first computer display.*

*32. The system of claim 26, wherein means for interactively editing the at least one frame comprises:*

*means for interactively modifying display parameters of the at least one frame.*

*33. The system of claim 26, wherein means for reviewing the at least one frame comprises:*

*means for reviewing the at least one frame on the second computer display while blanking the at least one frame on the first computer display means of a switch.*

*34. The system of claim 26, wherein means for interactively editing the at least one frame on the second computer display comprises:*

*means for interactively editing one or more discrete sections of the at least one frame on the second computer display.*

*35. The system of claim 26, further comprising:*

*means for making previously recorded real time and stored video images and stored documents available for retrieval as visual elements in accordance with unique index numbers;*

*means for viewing available visual elements to select elements for inclusion in said frames in accordance with unique index numbers; and*

*means for selecting a sequence of frames to form said plurality of frames for presentation.*

*36. An interactive method for making a customized presentation on a first computer display based upon a prepared script file containing a plurality of frames, at least one of the plurality of frames including at least one uniquely addressable visual element, the prepared script file interactively created by retrieving the at least one visual element and displaying the at least one visual element at a discrete addressable section on the first computer display and allowing one or more visual elements to be iteratively added to or deleted from the first computer display, the method comprising:*

*reviewing the at least one frame on a second computer display while blanking the at least one frame on the first computer display;*

*interactively altering one or more display parameters of the at least one frame on the second computer display; and*

*displaying the at least one altered frame on the first computer display.*

*37. The method of claim 36, wherein interactively altering one or more display parameters of the at least one frame comprises one or more of the following:*

*editing a number of elements displayed;*

*editing a size of at least one of the elements displayed*

*editing a relative position between the elements displayed;*

*editing a zoom level of at least one of the elements displayed; and*

*editing the timing of at least one of the elements displayed.*

*38. The method of claim 36, further comprising:*

*selectively changing an order of the plurality of frames for display on the first computer display.*

*39. The method of claim 38, wherein selectively changing the order of the plurality of frames comprises at least one of the following:*

*deleting at least one of the plurality of frames from being displayed on the first computer display; and*

*selecting any frame from the plurality of frames for display on the first computer display.*

*40. The method of claim 36, wherein each of the at least one visual element comprises one of the following: text, graphics, still and motion video.*

*41. The method of claim 36, wherein reviewing comprises:*

*reviewing at least one frame of the plurality of frames on the second computer display while blanking the at least one frame on a plurality of computer displays including, the first computer display;*

*and wherein displaying comprises:*

*displaying the at least one altered frame on the plurality of computer displays including the first computer display.*

*42. The method of claim 36, wherein reviewing the at least one frame comprises:*

*reviewing the at least one frame on the second computer display while blanking the at least one frame on the first computer display using a switch.*

*43. The method of claim 36, further comprising one or more of the following prior to making said presentation:*

*making previously recorded real time and stored video images and stored documents available for retrieval as visual elements in accordance with unique index numbers;*

*viewing available visual elements to select elements for inclusion in said frames in accordance with unique index numbers; and*

*selecting a sequence of frames to form said plurality of frames for presentation.*

* * * * *